J. HUBBARD.
SELF FEEDING CALF BUCKET.
APPLICATION FILED MAY 15, 1917.
1,251,376.
Patented Dec. 25, 1917.
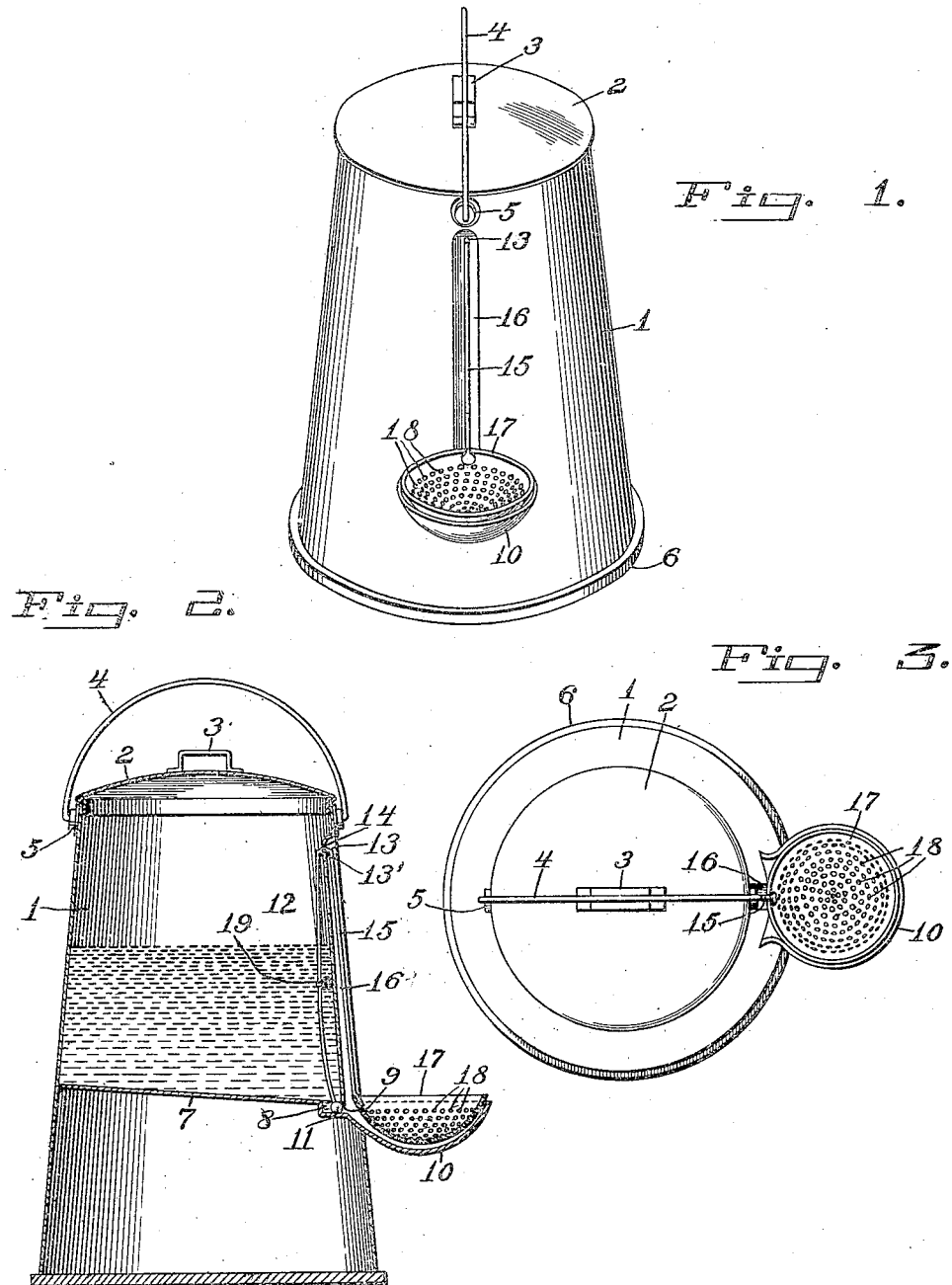
INVENTOR
James Hubbard
BY Victor J. Evans
ATTORNEY
WITNESSES
G. E. Logan Jr.
D. B. Phillips.

UNITED STATES PATENT OFFICE.

JAMES HUBBARD, OF LONDON, OHIO.

SELF-FEEDING CALF-BUCKET.

1,251,376.     Specification of Letters Patent.     Patented Dec. 25, 1917.

Application filed May 15, 1917. Serial No. 168,851.

*To all whom it may concern:*

Be it known that I, JAMES HUBBARD, a citizen of the United States, residing at London, in the county of Madison and State of Ohio, have invented new and useful Improvements in Self-Feeding Calf-Buckets, of which the following is a specification.

This invention relates to improvements in stock feeding devices, and has especial reference to an improved feeder for supplying liquid nourishment to calves and other young animals.

In supplying liquid food such as milk to a calf in an open receptacle, the animal has a tendency to drink greedily and thereby disorganize the digestive system. It is the primary purpose of the present invention to furnish a feeding bucket wherefrom the calf may obtain only a limited quantity of food at a time, thereby promoting assimilation. It is my further intention to supply a more efficient means for actuating the release valve of such a device, and to provide a more convenient form and arrangement of parts.

With these and other objects in view I have embodied my invention in the structure described in the specification and claims below and illustrated in the accompanying drawings, in which—

Figure 1 is a perspective view of the bucket.

Fig. 2 shows a section through the bucket and feeding trough.

Fig. 3 is a plan view.

Referring now to the drawings in detail, the device comprises a food container or bucket of metal or other suitable material and preferably frustoconical in form, whereby greater stability is secured. A lid 2 having a hand hold 3 is provided for the bucket, and a bail 4 may be swingingly attached to suitable lugs 5, secured exteriorly of the bucket toward the upper end in the usual manner. A base 6 of wood or other suitable material is attached to the lower end of the bucket 1, and spaced vertically at a convenient distance from the base 6 is the bottom 7. The bottom is angularly disposed to the base, and has at the lowest portion a depression 8 adjacent the side of the bucket; and the side is formed outwardly from the depression with an opening 9 for withdrawal of food. It will be noted that by the above construction the bucket may be completely emptied without tipping.

Attached exteriorly of the bucket beneath the opening 9, and adapted to receive food escaping therethrough is a lip or cup 10, preferably of arcuate section, constituting a food dispenser 10. The flow of food to the dispenser 10 is normally prevented by suitable means shown as a valve 11 of proper form to engage the inner side of the bucket and obstruct the opening 9, and the valve 11 is adapted for movement to an open position by a contact element in the dispenser. To effect such movement, I have in the present instance mounted the valve 11 on the extremity of a rod 12 extending upwardly for rigid attachment to a pivoted link 13.

The link 13 extends through an opening 14 wherewith the side of the bucket is formed near the top, and is provided with a suitable pivotal mounting 13' attached to the bucket. A second rod 15 has one end rigidly attached to the link 13 outwardly of the bucket, and terminates at the other end in a hollow contact element 17 constituting a food receptacle located within the dispenser 10 for actuation by the nose of the animal to open the valve.

In the preferred form of my invention the rod 15 and link 13 are disposed in a depression or slot 16 formed in the side of the bucket, whereby they are protected from damage and are out of the way of the nose of the animal.

A spring means normally maintaining the valve in the closed position is provided; and is here shown as a tension spring 19 attached to the rod 12 and the adjacent side of the bucket. The contact element 17 preferably corresponds in shape to the interior of the dispenser 10, from which it is spaced apart for free movement, and is formed with a plurality of openings 18 to permit free entrance of the food in the dispenser.

In operation the bucket is filled with liquid food to a desired height and the contact element 17 manually actuated to open the valve and fill the dispenser 10. In endeavoring to completely empty the dispenser, the calf will actuate the contact element 17, thereby repeatedly filling the dispenser as required.

While I have here shown and described a preferred form of my invention for purposes of illustration, such embodiment is not to be interpreted as in any way limiting the spirit and scope of the invention, such limitation being confined to that indicated in the accompanying claims.

What I claim

1. In a feeding device, a container having a slanting bottom and formed in the side with an opening adjacent the lowest portion of the bottom, a trough affixed to the exterior of said container and adapted to receive food through said opening, a perforated receptacle in said trough, a valve normally closing said opening, and a link pivoted to an upper portion of the container and having a limb extending downwardly into the container and connected to the valve, said link having a second limb extending downwardly outside the container and connected to said receptacle, whereby a swinging movement of the receptacle will open the valve.

2. In a feeding device, a container formed in the side with an opening, a trough affixed to the exterior of said container and adapted to receive food through said opening, a perforated receptacle in said trough, a valve normally closing said opening, and a link pivoted to an upper portion of the container and having a limb extending downwardly into the container and connected to the valve, said link having a second limb extending downwardly outside the container and connected to said receptacle, whereby a swinging movement of the receptacle will open the valve.

In testimony whereof I affix my signature.

JAMES HUBBARD.

Copies of this patent may be obtained for five cents each, by addressing the "Commissioner of Patents, Washington, D. C."